Sept. 8, 1953
W. O. TAFF ET AL
METHOD OF REDUCING CONTAMINANTS
ON FINELY DIVIDED CATALYST
Filed Feb. 21, 1950
2,651,600
CATALYST IRON CONTENT VS. PARTICLE SIZE
AFTER CONTAMINATION BY OPERATION FOR
182 HOURS WITH FEED STOCK CONTAINING IRON NAPHTHENATE
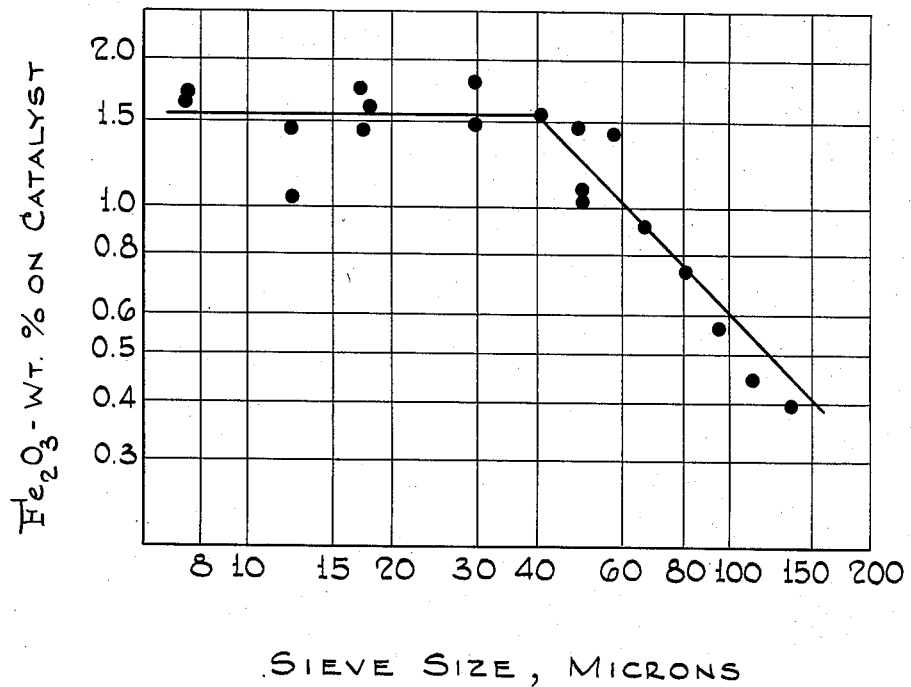
SIEVE SIZE, MICRONS
Wilfred O. Taff
Robert L. Hardy   Inventors
By P. O. Dunham  Attorney Patented Sept. 8, 1953

2,651,600

UNITED STATES PATENT OFFICE 2,651,600

METHOD OF REDUCING CONTAMINANTS ON FINELY DIVIDED CATALYST

Wilfred O. Taff and Robert L. Hardy, Cranford, N. J., assignors to Standard Oil Development Company, a corporation of Delaware Application February 21, 1950, Serial No. 145,406

4 Claims. (Cl. 196—52)

This invention relates to the conversion of hydrocarbons in the presence of finely divided catalyst by the fluid process and is particularly directed to a method of reducing the amount of contaminants which normally accumulate on the catalyst as the process continues.

When converting hydrocarbons according to the fluid process, and particularly in the catalytic cracking of hydrocarbon oils, the hydrocarbons to be converted are passed in vapor form upwardly through an enlarged reaction vessel containing a body of finely divided conversion catalyst at a velocity controlled to maintain a relatively dense, highly turbulent liquid-like bed of catalyst and vapor in the lower portion of the reaction vessel. During the process, a portion of the oil is converted into solid coke-like deposits which remain on the catalyst and reduce its effectiveness. To remove these deposits, a stream of catalyst is continuously withdrawn from the reaction vessel and passed into a regeneration vessel wherein the catalyst is contacted with air to burn the deposits, after which the regenerated catalyst is returned to the reaction vessel. In carrying out the regeneration, the air for burning the deposits is passed upwardly through the reaction vessel at a controlled velocity to maintain a highly turbulent fluid-like bed in the regeneration vessel similar to that existing in the reaction vessel.

In carrying out the fluid cracking process as above described, the catalyst gradually deteriorates in such manner that a progressively larger proportion of the oil feed is converted into coke and gas for a given yield of gasoline. In other words, the ratio of the amount of coke and gas to the amount of gasoline produced from a given amount of feed oil increases as a result of the catalyst deterioration.

The amount of coke and gas relative to the amount of gasoline formed under a given set of conditions is a measurement of the selectivity of the catalyst as distinguished from the activity of the catalyst. The latter is a measurement of the amount of oil converted under a fixed set of conditions.

In order to avoid excessive deterioration and to maintain the catalyst at the desired selectivity level, it has been a practice in many cases to reject a substantial amount of the catalyst from the system, either continuously or at frequent intervals, and to replace the rejected catalyst with fresh make-up catalyst having a higher level of selectivity. The total amount of make-up catalyst added daily to replace normal losses and that rejected from the system may amount to from 2 to 5% of the total amount of catalyst in the system, depending upon the rate of deterioration and the amount of contaminants contained in the feed. For example, in a fluid cracking unit capable of processing 20,000 barrels of oil a day and employing 300 tons of catalyst in the unit, the daily replacement rate to maintain the catalyst at the desired level may range from 5 to 15 tons a day. According to present practices, most of the catalyst discarded from the system is an aliquot portion of the catalyst contained in the system.

The purpose of the present invention is to reduce the amount of make-up catalyst which must be added as replacement in order to maintain the catalyst at the desired selectivity level.

The catalyst deterioration is due, in part at least, to the gradual accumulation of metallic constituents and particularly iron. These metallic constituents being non-combustible, are not removed during the regeneration treatment and, therefore, tend to build up on the catalyst as the process continues. One source of such metallic contamination is the presence of oil soluble iron and other metallic compounds present as impurities in the feed oil. Such impurities may be corrosion products resulting from the reaction of naphthenic and other organic acids normally present in the feed oil on the metal equipment which comes in contact with the oil.

It has been found that such oil soluble metallic contaminants as iron tend to deposit on the surface of the catalyst particles with a depth of penetration decreasing as the particle size increases. For instance, catalyst particles having a diameter below 40 microns tend to become completely and uniformly impregnated with contaminants whereas coarser catalyst particles having diameters in excess of 40 microns have a central core which is relatively free of contaminants. The volume of the outer layer of contaminated catalyst varies directly as the outside surface area of the catalyst particle and hence the percentage of contaminated catalyst is different for each particle diameter, decreasing as the diameter increases above 40 microns.

While the exact reason for this is not fully established, one possible explanation is as follows. When the oil and catalyst mix a film of oil is laid down on each particle which contacts with the oil. The thickness of this film is a constant for all catalyst sizes. This film of oil penetrates into the pores of the catalyst by capillary action until the oil film is completely absorbed, at which time the capillary driving force ceases and no further penetration occurs.

This explanation is supported by laboratory tests in which powdered catalyst of the silica alumina type was treated for a period of 182 hours with a feed stock containing iron naphthenate as an impurity. Following this treatment, the catalyst was segregated into fractions of different particle sizes and the iron content of the various fractions determined. The results of these tests are shown by the curve on the accompanying drawing wherein the logarithm of the iron content is plotted against the logarithm of the mean particle diameter. It will be noted that this curve is divided into two distinct parts with a knee at about 40 microns. For particles below 40 microns, the curve is horizontal showing that the penetration of the catalyst with iron is complete and uniform for particles up to 40 microns. For particles above 40 microns in diameter, the curve drops at an angle of about 45°. This indicates that the concentration of iron on these coarser particles is proportional to the outside surface of the particles.

Assuming this explanation to be correct, as judged from these data, the depth of penetration of impurities into the coarser particles has been calculated and the results are tabulated below.

| Size Range | Av. Size, Microns | Penetration, Microns | Percent Contaminated |
|---|---|---|---|
| <40 | 20 | Complete | 100 |
| 40–60 | 50 | 9.5 | 76.2 |
| 60–80 | 70 | 8.5 | 51.5 |
| 80–100 | 90 | 7.8 | 38.5 |
| 100+ | 120 | 6.2 | 28.2 |

It has also been observed that during the conversion operation, the surface of the catalyst particles tends to wear away due to the grinding action of the particles on each other and due to contact of the catalyst particles with the hard metallic surface of the equipment. The extremely fine grindings formed during the process are largely removed from the surface of the particles as a result of the grinding action. Consequently, the fine grindings from the coarser particles having a diameter above 40 microns will contain a higher concentration of contaminating metals than the particles from which they were ground, since the contaminants do not penetrate throughout the catalyst particles.

In accordance with the present invention, the portion of the catalyst discarded from the system to maintain the circulating catalyst at the desired selectivity level consists mostly of fine particles having a particle diameter below 40 microns, rather than an aliquot part of the total catalyst stream and the catalyst used to replace the catalyst so discarded, has an average particle size substantially above 40 microns and preferably from 60 to 100 microns or higher. As a further phase of the present invention, the rate of grinding or attrition of the catalyst in the system is controlled to form enough fine particles below 40 microns to replace that removed from the system and to retain enough of this size material in the system to impart the necessary flow characteristics thereto. It has been found desirable to have a definite amount of such fine particles in the circulating stream of catalyst to insure proper flow and avoid slugging. For example, it is usually desirable to have from 10 to 20% of particles below 40 microns in diameter in the stream of circulating catalyst to avoid operating difficulties.

The fraction of fine catalyst withdrawn from the system in accordance with the present invention, may be collected at any desired point in the circulating catalyst stream. For example, the catalyst may be collected in the final stages of the catalyst collecting system. For example, in carrying out a fluid cracking process the exhaust gases from the regenerator normally pass through cyclone separators, after which the gas is cooled and then passed to a Cottrell precipitator. The catalyst separated from the exhaust gas in the Cottrell precipitator and also catalyst in the final stage of the cyclones will normally be composed of fine particles made up mostly of particles below 40 microns in diameter. These fines can be withdrawn from the cyclone and the electrical precipitator and rejected from the system. However, in carrying out this invention, it is not necessary to employ an electrical precipitator for separating the final traces of catalyst from the regeneration gas, since this catalyst is rejected from the system in any event. The fraction of catalyst appearing in the final cyclone use for separating the catalyst from the converted vapors, and also the catalyst escaping from the cyclone and appearing in the cycle oil condensed in the bottom of the product fractionator will also be made up largely of particles below 40 microns in diameter. A part or all of these fractions normally segregated may be discarded. In some cases, it may be desirable to provide an additional means for collecting and separating fines within the unit. Such means may, for example, be an air or gas classifier or elutriator wherein the catalyst is treated with a slow, upflowing stream of gas in an enlarged vessel under conditions controlled to selectively carry overhead the finer particles of desired size.

The rate of attrition of the catalyst can be controlled or regulated in two ways. One way is to control the hardness or attrition characteristics of the catalyst during its preparation. The catalyst commonly used for cracking oil has a gel structure containing silica gel as a major component and alumina, magnesia or other metal oxides as a minor but active component. These gels are commonly formed by reacting sodium silicate with an acid under controlled conditions to form a hydrosol. Upon standing, this hydrosol sets into a hydrogel. This hydrogel is then washed free of reaction impurities. Following the washing treatment, the hydrogel is dried and activated. The alumina or magnesia to be incorporated into the gel may be added in various ways. For example, a salt of aluminum may be added during the formation of the hydrosol, or after the formation of the hydrosol, or the hydrogel may be impregnated with a solution of the salt and thereafter treated with ammonia to decompose the salt into the hydroxide. By varying the concentration of the solutions, the length of the washing treatment, the temperature of the washing treatment and the hydrogen ion concentration thereof, gels of various degrees of hardness can be prepared. In general, the attrition characteristics of the gel or, in other words, its ability to be ground or worn away during operation, is a function of the apparent density of the gel. The lower the apparent density, the softer the catalyst and the higher the apparent density, the harder the catalyst. Various means for controlling the apparent density of gels is already known in the art and described in patent literature, such as in United States Patents 1,900,859; 2,000,106; 2,481,825 and 2,429,319. By controlling the apparent density of the gel during its preparation, gel particles of widely different attrition characteristics may be made.

Another more direct way of controlling the rate of grinding or attrition of the catalyst during operation of the process, is to provide means within the cracking equipment for accelerating the rate of attrition. For example, the attrition within the unit may be accelerated by injecting a high velocity stream of gas into a slow moving, highly concentrated suspension of catalyst and gas or vapor. For example, a high velocity stream of steam may be injected through nozzles into the catalyst during its transfer between the reactor and the regenerator. By controlling the velocity of the gas so injected, the rate of attrition within the unit itself can be controlled. Attrition may also be controlled by impinging a suspension of catalyst and vapor at varying velocities against a hard surface. Other apparatus capable of effecting surface grinding of the catalyst particles may be installed in the equipment to control the rate of acceleration or grinding of the particles.

As before stated, the present invention involves rejecting from the catalyst circulating system a relatively fine fraction of catalyst particles composed mainly of those having a diameter below 40 microns at a rate sufficient to maintain the catalyst at the desired selectivity level, while adding relatively coarse catalyst to replace that rejected and controlling the rate of grinding of the catalyst in the system to convert the coarser fraction into the finer fraction at a rate corresponding to the amount of the fine fraction rejected.

The amount of catalyst which should be rejected in accordance with the present invention depends on the amount of contaminants contained in the feed, the effect of such contaminants on the catalyst, and other factors, so that the rate of discard will vary in commercial operations. For example, in a medium size fluid cracking plant adapted to charge 20,000 barrels per day of feed oil containing about 10 pounds of contaminants per 1000 barrels of feed and circulating about 300 tons of catalyst, it is necessary to replace catalyst at a rate of 10 tons a day to prevent building up more than 1% of contaminants on the catalyst when using the conventional method of replacement. If the catalyst in the unit has an equilibrium particle size range of 20% by weight in each of the following sizes, less than 40 microns, 40–60, 60–80, 80–100 and 100+ only about 58.6% of the catalyst would contain contaminant and the remainder would be uncontaminated catalyst in the central cores of the larger particles. That portion of the catalyst actually contaminated would contain 1.70% of $Fe_2O_3$. By employing the present invention and replacing the fine particles with coarse and using the same catalyst replacement rate, all of the catalyst discarded would contain contaminant in a concentration of 1% while the equilibrium concentration of the entire charge of catalyst in the unit would be only 0.58% $Fe_2O_3$. This advantage may be taken as per this illustration wherein for the same replacement rate the contamination level is reduced thereby permitting the maintenance of the catalyst at a higher selectivity level, or it may be taken as a lower replacement rate where for the same contaminant level only 58.6% (or 5.8 tons/day) of catalyst replacement is necessary to maintain the same contaminant level in the case illustrated.

The term "catalyst selectivity" as used herein means the ratio of coke or fixed gas to gasoline produced from a given amount of feed in the presence of a catalyst and under a fixed set of conditions. The fixed gases do not normally include the butane-butene fraction, but include other lower boiling gases formed in the operation.

Having described the preferred embodiment of the invention, it will be understood that the invention embraces such other variations and modifications as come within the spirit and scope of the accompanying claims.

What is claimed is:

1. In a continuous process for the conversion of hydrocarbons wherein conversion is obtained in the presence of finely divided fluidized catalyst having a gel structure, the catalyst continuously circulating through a reaction zone and a regeneration zone and wherein there is a gradual accumulation of non-combustible contaminants on the catalyst as the process continues, the catalyst above 40 microns in diameter acquiring a surface coating of non-combustible contaminants and having a central core free of the contaminants, the catalyst below 40 microns in diameter becoming completely impregnated with the contaminants, the steps which comprise adding to the circuit fresh catalyst in the form of a coarse fraction of a particle size above about 40 microns in diameter, subjecting the catalyst in the circuit to accelerated attrition beyond the normal attrition in the circuit whereby fine particles below 40 microns in diameter are formed due to the scrapings of the coarse catalyst and a central core substantially free of contaminants is exposed, and continuously separating and discarding from the circulating catalyst the fine particles contained therein at a rate to maintain in the circuit about 10 to 20% of the fine particles so as to maintain the fluidity of the catalyst, whereby a high level of catalyst activity is maintained within the circuit.

2. A process according to claim 1 in which the fresh catalyst added to the circuit is in the form of a coarse fraction of about 60 to 100 microns in diameter.

3. A process according to claim 1 in which the accelerated attrition is attained by effecting surface grinding of the catalyst.

4. A process according to claim 1 in which the accelerated attrition is attained by using a soft catalyst of low apparent density.

WILFRED O. TAFF.
ROBERT L. HARDY.

References Cited in the file of this patent

UNITED STATES PATENTS

| Number | Name | Date |
|---|---|---|
| 2,421,212 | Medlin | May 27, 1947 |
| 2,423,850 | Peery | July 15, 1947 |
| 2,437,352 | Fragen | Mar. 9, 1948 |